US009838642B2

(12) United States Patent
Tariolle et al.

(10) Patent No.: US 9,838,642 B2
(45) Date of Patent: Dec. 5, 2017

(54) METHOD FOR SIGNALING BROADCAST VIDEO CONTENT, AND RECORDING METHOD AND DEVICE USING THE SIGNALING

(75) Inventors: Francois-Louis Tariolle, Cesson Sevigne (FR); Eric Gautier, Cesson Sevigne (FR)

(73) Assignee: THOMSON Licensing, Issey-les-Moulineaux (FR)

(*) Notice: Subject to any disclaimer, the term of this patent is extended or adjusted under 35 U.S.C. 154(b) by 0 days.

(21) Appl. No.: 13/519,575

(22) PCT Filed: Dec. 28, 2010

(86) PCT No.: PCT/EP2010/070823
§ 371 (c)(1),
(2), (4) Date: Jun. 27, 2012

(87) PCT Pub. No.: WO2011/080283
PCT Pub. Date: Jul. 7, 2011

(65) Prior Publication Data
US 2012/0297435 A1  Nov. 22, 2012

(30) Foreign Application Priority Data
Dec. 28, 2009  (FR) .................................. 09 59618

(51) Int. Cl.
*H04N 5/781* (2006.01)
*H04N 5/775* (2006.01)

(52) U.S. Cl.
CPC ............. *H04N 5/781* (2013.01); *H04N 5/775* (2013.01)

(58) Field of Classification Search
CPC ............................... H04N 5/781; H04N 5/775
(Continued)

(56) References Cited

U.S. PATENT DOCUMENTS

2003/0041104 A1* 2/2003 Wingard ............ H04N 5/44543
709/203
2004/0136352 A1* 7/2004 Fu ....................... H04B 7/18578
370/341
(Continued)

FOREIGN PATENT DOCUMENTS

CN    1623331    6/2005
CN    1678061    10/2005
(Continued)

OTHER PUBLICATIONS

ETSI TS 102 034 V1.4.1, DVB; "Transport of MPEG-2 TS based DVB services over IP Based Networks", Aug. 2008.
(Continued)

*Primary Examiner* — Sumaiya A Chowdhury
(74) *Attorney, Agent, or Firm* — Brian Dorini; Ivonete Markman (57) ABSTRACT

A signaling method of video content and services broadcast by to a multitude of reception devices, the contents being encoded into data packets transmitted in a transport stream associated with a signaling stream is disclosed that comprises an insertion step of a unique identifier associated with each of the video contents or services in the signaling stream; an insertion step of the unique identifier into packets of the transport stream transmitting the video content or service corresponding to the unique identifier. Advantageously, the unique identifier is derived from a characteristic of the content among the title of the video content or service, the date and theoretical continuous broadcast time of the video content or service. A method for recording and a recording device using the signaling is further disclosed.

15 Claims, 5 Drawing Sheets

(58) Field of Classification Search
USPC .......................................... 725/32, 122, 121
See application file for complete search history.

(56) References Cited

U.S. PATENT DOCUMENTS

| | | | |
|---|---|---|---|
| 2004/0181811 A1* | 9/2004 | Rakib | 725/122 |
| 2005/0166257 A1* | 7/2005 | Feinleib | H04N 7/163 725/136 |
| 2005/0232592 A1 | 10/2005 | Kimoto et al. | |
| 2006/0193599 A1 | 8/2006 | Thijssen | |
| 2006/0253782 A1 | 11/2006 | Stark et al. | |
| 2006/0288273 A1 | 12/2006 | Erol et al. | |
| 2008/0112686 A1 | 5/2008 | Chen et al. | |
| 2008/0244679 A1* | 10/2008 | Sukumar et al. | 725/121 |
| 2009/0028529 A1 | 1/2009 | Kuhns | |
| 2009/0041129 A1* | 2/2009 | Suh | H04H 20/55 375/240.25 |
| 2009/0307740 A1* | 12/2009 | Keidar | 725/118 |
| 2010/0088717 A1* | 4/2010 | Candelore et al. | 725/32 |
| 2010/0092148 A1* | 4/2010 | Ogawa | G11B 27/105 386/306 |
| 2010/0131988 A1 | 5/2010 | Kent et al. | |
| 2010/0284408 A1* | 11/2010 | Lewis et al. | 370/394 |
| 2010/0306792 A1* | 12/2010 | Li | H04N 5/76 725/23 |

FOREIGN PATENT DOCUMENTS

| | | | |
|---|---|---|---|
| EP | 1398961 | 5/2002 | |
| EP | 1162839 | 5/2003 | |
| JP | 404034749 A * | 2/1992 | G11B 15/02 |
| JP | 2000041066 | 2/2000 | |
| JP | 2000083197 A | 3/2000 | |
| JP | 2000134588 | 5/2000 | |
| JP | 2002101086 | 4/2002 | |
| JP | 2002125204 | 4/2002 | |
| JP | 2002142183 | 5/2002 | |
| JP | 2002344889 | 11/2002 | |
| JP | 2004247788 | 9/2004 | |
| JP | 2007124383 | 5/2007 | |
| JP | 2009505515 | 2/2009 | |
| JP | 2007006473 A | 1/2011 | |
| WO | WO 01/65844 | 9/2001 | |
| WO | WO03063493 | 7/2003 | |
| WO | WO2007022033 | 2/2007 | |
| WO | WO2010054222 | 5/2010 | |

OTHER PUBLICATIONS

ETSI TS 102 468 V1.1.1 "Digital Video Broadcasting; IP datacast over DVB-H: Set of specifications for phase 1", Nov. 2011.
Schulzrinne etal, Network Working Group, "RTP: A transport protocol for real-time applications", Jul. 2003.
Wikipedia Web Page, Program Delivery Control (PDC) ETS 300 231 (ETSI), Published Aug. 1, 1996.
Freeview Wikipedia Web Page, Published Oct. 30, 2002.
ISO IEC 13818-1 Second ed. , "Information technology-Generic coding of moving pictures and associated audio information: systems", Dec. 1, 2000.
ETSI EN 300468 V1.9.1(Nov. 2008): "Digital Video Broadcasting; Specification for Service Information in DVB systems"; Mar. 1, 2009.

* cited by examiner

METHOD FOR SIGNALING BROADCAST VIDEO CONTENT, AND RECORDING METHOD AND DEVICE USING THE SIGNALING

This application claims the benefit, under 35 U.S.C. §365 of International Application PCT/EP2010/070823, filed Dec. 28, 2010, which was published in accordance with PCT Article 21(2) on Jul. 7, 2011 in French and which claims the benefit of French patent application No. 0959618, filed Dec. 28, 2009.

SCOPE OF THE INVENTION

The invention relates to the general domain of the broadcasting of digital data over a network. More particularly, the invention relates to a signalling method of video content and services as well as a method and device for recording video content and services using this signalling.

PRIOR ART

The invention applies more particularly to the digital television receivers/decoders referred to more simply hereafter as decoders. The network broadcasts audiovisual programmes more commonly called 'events' and data intended to reference them. This data is for instance defined in the DVB-SI specifications ('Digital Video Broadcast-Specification for Service Information') They are presented in the form of tables and descriptors that describe the objects sent over the broadcast network. A service is an uninterrupted sequence of events broadcast on a given stream.

Typically, the following tables are found in the streams compliant with the DVB-SI standard: NIT, SDT, EIT and possibly BAT. The NIT table defines the general structure of the network and indicates the list of the transport streams and broadcast services. The SDT table provides additional information relating to the broadcast services, for example the unencrypted name of a service. The EIT table indicates a list of events for each service. It can notably indicate the event being broadcast. As for the BAT table, it resembles several services that can be from several broadcast networks Using the data contained in these tables, the decoder can search the stream that broadcasts the event required by the user. A software application calls 'Electronic Programme Guide' (EPG for short) displays the characteristics of the broadcast events such as the title, a theme, a summary, the broadcast time. It thus facilitates the choice of the user.

If the user is absent, the decoder can record the event. He has for this a hard disk that stores the audiovisual programmes in a compressed format. For this the decoder triggers the start and end of the recording by means of time data, for example, contained in the EPG.

In the prior art, this triggering relies on an alarm programmed by the user, an alarm programmed by means of the data of the EPG advantageously enlarged by the user or again by a signal transmitted simultaneously at the event with a relative position.

These different triggering systems are based on the theoretical time of broadcast contained in the signalling data. They are decorrelated from the real time, effective, of the broadcast of the event. Now, modifications of the broadcast time of the events are common. If the event starts too early, the user misses the start of the event, if the event is delays or interrupted by adverts for example, the user misses the end of the event, finally a deprogramming of an event leads the user to record a programme not required unnecessarily occupying memory space on the decoder.

A triggering solution based on the use of a signal transmitted during the event in itself, for example using the VPS/PDC standard (Programme Delivery Control specified in the standard ETS 300 231, published by the 'European Telecommunications Standards Institute' or ETSI, using codes hidden in the teletext data) has the advantage of synchronising the triggering with the real time of broadcast. An accuracy of one second is defined in the standard.

However, this solution does not enable the strict recording of the event, that is to the nearest picture both for the start and end of the content, or again in the middle of the latter (adverts). A solution enabling the precise synchronisation of the recording of an event is therefore desirable.

SUMMARY OF THE INVENTION

The purpose of the invention is to overcome at least one of the disadvantages of the prior art.

For this purpose, the invention relates to a signalling procedure of video content and services broadcast by a television operator to a multitude of reception devices, the contents being encoded into data packets transmitted in a transport stream associated with a signalling stream: The method comprises an insertion step of a unique identifier associated with each of the video contents or services in the signalling stream: an insertion step of a unique identifier into packets of the transport stream transmitting the video content or service corresponding to the unique identifier.

Advantageously, the identifier, inserted in the transport packets, enables a detection of the content to the nearest picture ready at the start, end or in the event of interruption of the programme by adverts.

According to a particular characteristic of the invention, the unique W identifier associated with each of the video contents or services is derived from a characteristic among the title of the video content or service, the date and theoretical continuous broadcast time of the video content or service. According to a particular characteristic of the invention, the unique identifier ($M_i$) is inserted for the ES data packets called main identified by a PID determined in a stream compliant with the MPEG standard.

According to a particular characteristic of the invention, the unique identifier associated with each of the video content or services is inserted into the extension field of RTS packets of an IP transport stream.

According to another embodiment of the invention, the unique identifier associated with each of the video content or services is inserted as private data into the adaptation field of ES packets of an MPEG2-TS transport stream.

Moreover, the invention relates to a recording procedure of video content and services broadcast by a television operator to a multitude of reception devices, the contents being encoded into data packets transmitted in a transport stream associated with a signalling stream. The method comprises a reception step of the signalling flow; a reception step of data packets sent in the transport flow; a detection step of a unique identifier associated with each of the video contents or services in the signalling stream; a detection step of a unique identifier packets of the transport stream associated with the content to record; and a recording step of each packet of the transport stream with the content to record.

According to a particular characteristic of the invention, the method further comprises a step for selecting a video content or service to record and for determining the unique identifier from data of the signalling stream corresponding to the video or service content to record.

According to another particular characteristic of the invention, the method further comprises a step for activating data packet reception of the transport stream from data of the signalling stream.

The invention further relates to a recording device implementing the recording method previously described.

BRIEF DESCRIPTION OF THE FIGURES

The invention will be better understood and illustrated by means of non-restrictive embodiments and advantageous implementations, with reference to the accompanying drawings, wherein.

DETAILED DESCRIPTION OF EMBODIMENTS OF THE INVENTION

The present invention comprises a method and device in which a client programs the recording of a video content broadcast for example by using the data of a programme guide. The broadcast of the content constitutes an event $E_i$. According to the invention, a unique identifier $M_i$ is associated with the event $E_i$. This identifier $M_i$, defined in the signalling data $E_i$, is inserted into the transport packed of the content to record. Only the data packets corresponding to this content are recorded. The present invention has the advantage of synchronising the recording of a content to the nearest picture both for the start and end of the content, or again in the middle of the latter (adverts).

Figure 1:
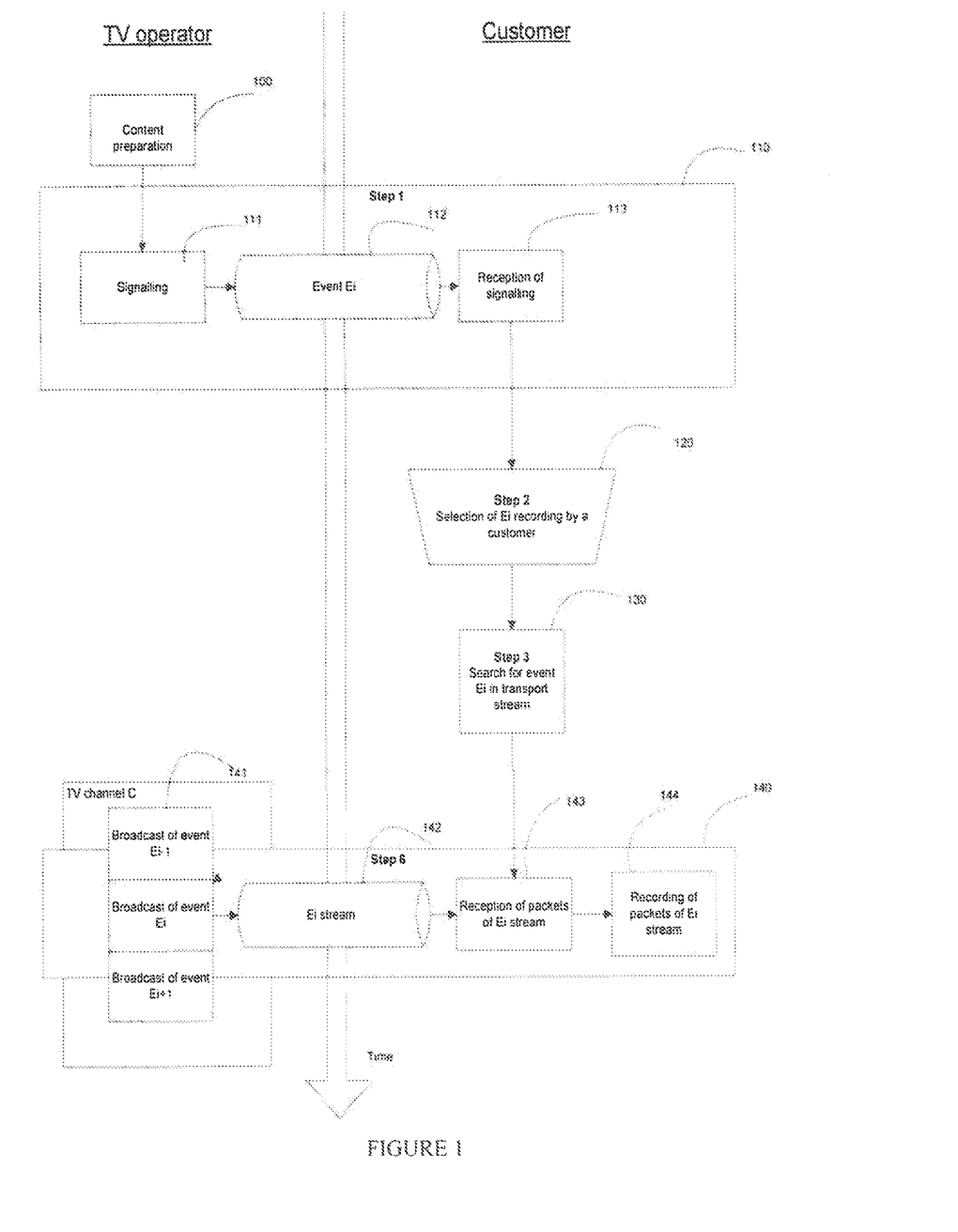
FIG. 1 illustrates a signalling and recording method according to a particular embodiment.

FIG. 1 illustrates a signalling and recording method according to a particular embodiment During a first step 100, the television operator prepares the broadcast of a content for a given date and time. This broadcast corresponds to the event $E_i$: the video content is compressed into a binary stream intended to be sent to clients in a transport stream. A second step 110 comprises the signalling 112 of the event $E_i$. Among the information comprised in the signalling of event $E_i$, data relating to the theoretical broadcast of the content at a given data and time on a given channel, the unencrypted name of the programme, the unique identifier $M_i$. The signalling 112 is prepared by the TV operator in a step 111 and is received by the client in a step 113. During a step 120, the client analyses the signalling information 112, selects the event $E_i$ to record and determines the unique identifier $M_i$ associated with this event $E_i$. During a step 130, the client activates the reception of the data packets on the channel at the scheduled broadcast time. Step 140 comprises the reception 143 of data packets of $E_i$ of the transport stream 142 and the recording 144 of this stream in storage means of the decoder of the client. According to a particularly characteristic, the step 140 comprises the activation of continuous reception 143 automatically from a standby status of the decoder using signalling information 112, in particular the date and time of broadcast $E_i$ of the content. According to the embodiments, this transmission uses the IP networks (IPTV) or broadcast networks of the satellite, radio or cable type (DVB MPEG2-TS).

According to a particular characteristic, the unique identifier $M_i$ is derived from the title of the content encrypted by a hash function. According to a variant, the unique identifier $M_i$ is derived from the date and theoretical time of broadcast of the video content. The identifier $M_i$ can associate the data packets received by the decoder with a content. The identifier $M_i$ is sent at the level of the transport session, for example over an IP network in RTP packets or over a DVB network in the adaptation field of the MPEG2-TS. The unique identifier $M_i$ is advantageously sent in metadata associated with the broadcast of the content.

According to one embodiment, the audio and video content are encoded according to the MPEG communication protocol. A packet known as elementary or ES (Elementary Stream) contains a unique type of data (video, audio 1 or audio 2) of which the format depends on the function of the codec used. The MPEG transport layer defines a transport stream of ES packets. Each ES packet is identified by its PID in the header of the MPEG2-TS packet. The different PID relating to a content are described in the PMT associated with the service. Among the different ES packets, a main ES packet is determined Advantageously, the main ES packet is a packet that is systematically decoded. For example, the first packet starting each GOP (Group of Pictures), that is each intra-picture.

Advantageously, the unique identifier is inserted into each main ES. Further, the Mi identifier will be advantageously transported by the same ES during the entire event. This characteristic considerably reduces the repetition of the identifier to insert into the transport stream. The decoder detects the main ES packet by means of the identifier and associates it with the other ES packets of the stream by means of the PMT table. All these packets are stored in the decoder for a recording. Naturally, the invention is not limited to the embodiment. In particular, if the content is a radio transmission, the main ES is of the audio type. In particular, if the content is a scalable video content. Each ES packet can be a main packet.

According to an embodiment, the contents are broadcast over a broadband IP network, thus offering a IPTV service as defined in the DVB-IPTV standard (in 'DVB-IPTV 1.4: Transport of MPEG 2 TS Based DVB Services over IP Based Networks', TS 102 034 V1.4.1, dating from August 2009).

Figure 2:
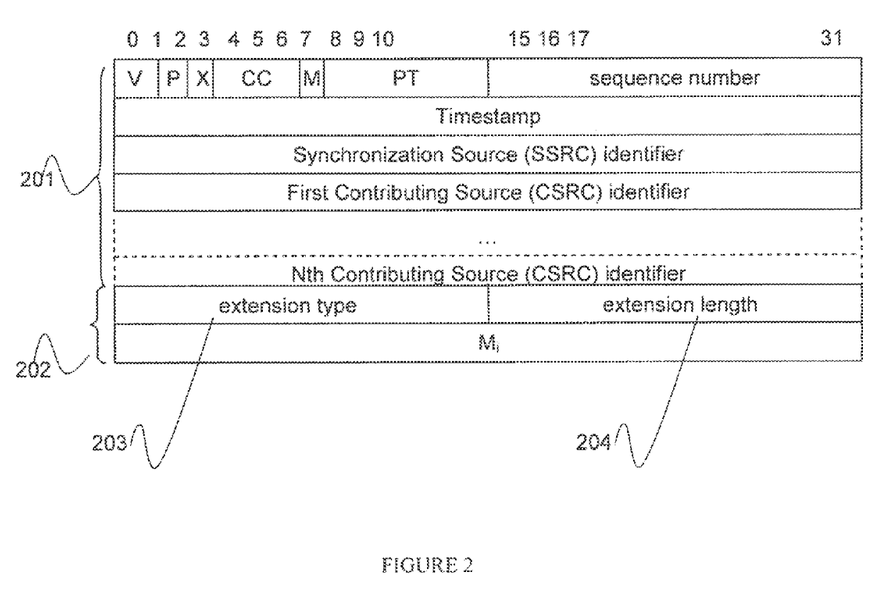
FIGS. 2 and 3 show transport stream packets according to two embodiments (DVB-IPTV and DVB-MPEG2-TS)

According to a particular embodiment of IPTV, the transport stream uses the RTP protocol detailed in the RFC 3350 'RTP: A Transport Protocol for Real-Time Applications' by H. Schulzrinne, S Casner, R Frederick and V Jacobson in July 2003. FIG. 2 shows packets of an RIP transport stream according to the DVB-IPTV particular embodiment.

According to a DVB-IPTV particular embodiment, the signalling is realized by means of programme guide technologies such as SD&S ('Service Discovery and Selection' of DVB-IPTV) or BCG ('Broadcast Content Guide' of DVB-IPTV) or even TV-Anytime.

According to a particular characteristic, the identifier $M_i$ is derived from the GRID (Content Reference Identifier) introduced into the DVB-IPTV programme guide (Broadband Content Guide) by compressing it for example by a hash function. The identifier $M_i$ is sent with the signalling information.

According to another particular characteristic, the identifier $M_i$ is also sent in the RTP packets transporting data packets, advantageously the main packets as described previously. In FIG. 2, a new RTP header format is defined, it comprises an RIP header 201 and an RTP header extension 202 filled in by the bit X of the header 201. The extension field of the header 302 advantageously comprises a 'unique identifier' field $M_i$. This new field is encoded on 32 bits. The type 203 and length 204 of the new extension field of the header 202 are advantageously completed.

According to another embodiment, the contents are broadcast over a satellite broadcast, cable or radio network using the MPEG2-TS standard (in ISO/IEC 13818-1: "Information technology—generic coding of moving pictures and associated audio information: Part 1 Systems").

According to a particular embodiment of DVB-MPEG2-TS, the signalling based on the MPEG2-PSI and DVB-SI tables is inserted in the transport stream itself.

Figure 3:
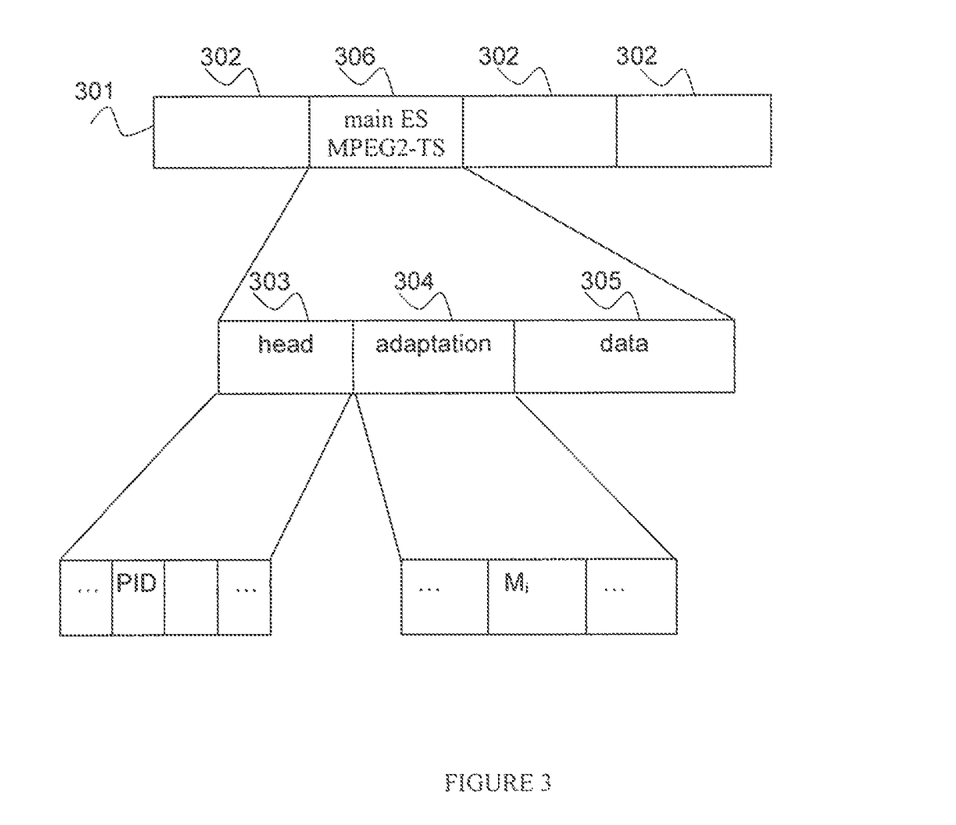

FIG. 3 shows packets 302, 306 of a transport stream MPEG2-TS 301 according to the embodiment DVB-MPEG2-TS. A TS packet 302, 306 is composed of a header 303, an optional adaptation field 304 and useful data 305. According to a particular characteristic, the identifier $M_i$ is sent in the adaptation field 304, dedicated to the transport of private data. Advantageously, this field is added only to the packets 306 transporting the main ES as previously described. This field comprises 7 additional bytes of which 4 bytes for the identifier $M_i$ and one byte to indicate the size of the private data that is the identifier $M_i$.

Figure 4:
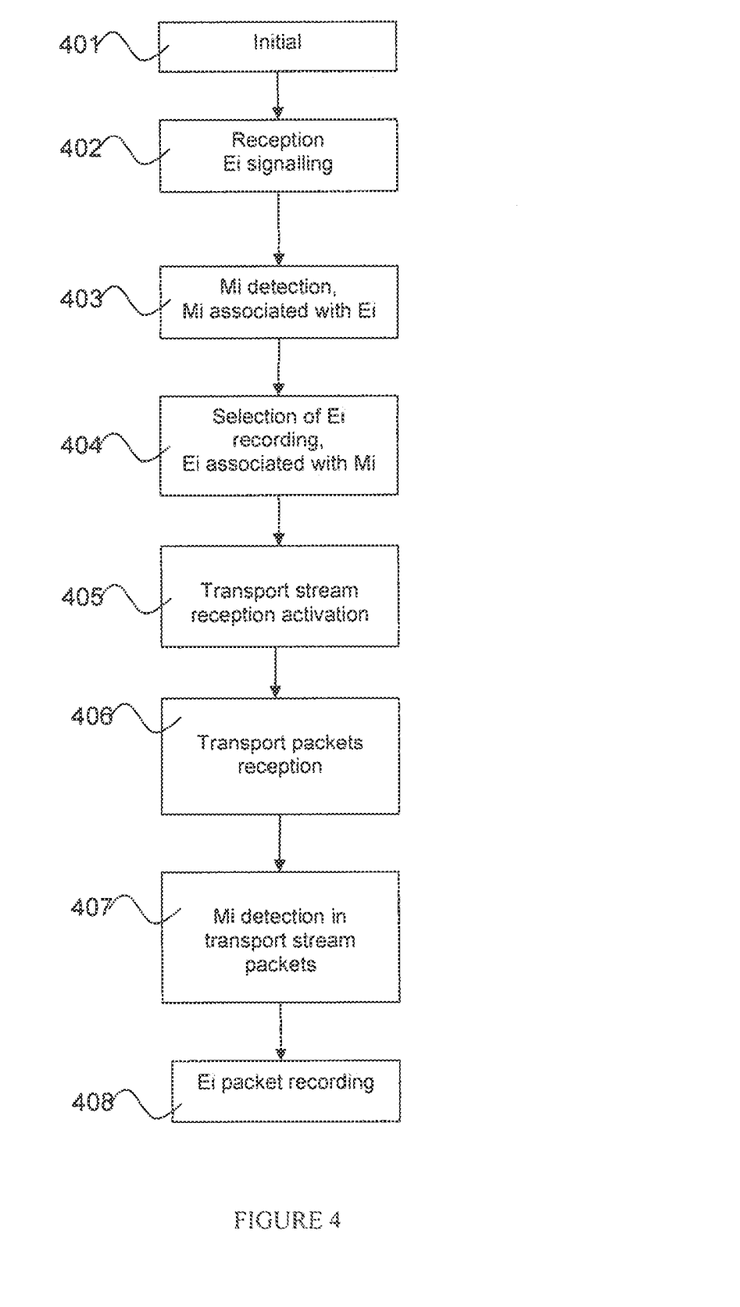
FIG. 4 illustrates a recording method according to a particular embodiment.

FIG. 4 illustrates a recording method according to a particular embodiment. In an initial status 401, a first reception step of the signalling of events $E_i$ is reached. The signalling of an event $E_i$ comprises, among other things, information on the title of the content, the date and time of start of broadcast scheduled, the date and time of end of broadcast, the broadcast channel. It further comprises the unique identifier $M_i$ according to the invention. In the step 403, the signalling information are decoded and the identifier $M_i$ associated with $E_i$ is detected. The reception and decoding of this signalling informs the user via the EPG on the content broadcast. During a step 404, the user selects a content to record corresponding to an event $E_i$ and a marker $M_i$. In the prior art, the recording is triggered from the start and end time of broadcast scheduled According to a variant, the activation and reception of the transport stream is triggered from the start and end time of broadcast scheduled during an optional step 405. For more security, a margin is taken with respect to the start and end time According to another variant, the reception 406 is continually activated on the channel broadcasting the programme to record. During a step 407, the unique identifier $M_j$ corresponding to an event $E_i$ is detected in the transport packets. If this identifier $M_j$ corresponds to the identifier $M_i$ of the content to record than this packet is a main ES packet associated with the content to record. Using this information and the PMT tables the packets of the content are recorded in the storage means of the recording device in a step 408. At the end of the recording, detected either by the theoretical end of the time, or by the reception of a determined number of packets carrying a different identifier $M_j$, the initial status is reached again.

Figure 5:
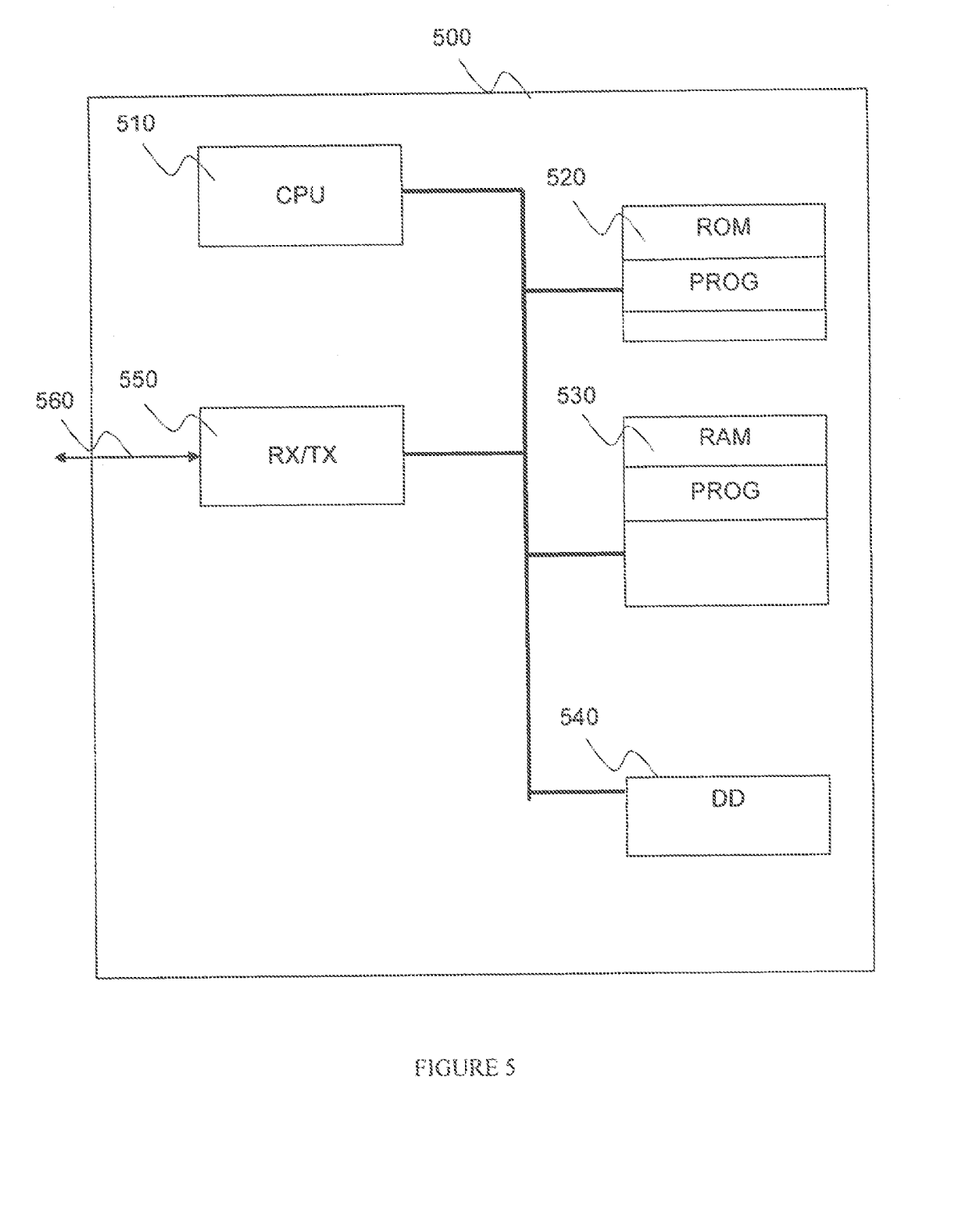
FIG. 5 shows a recording device implementing the invention.

FIG. 5 shows a recording device implementing the invention. The reception device is for example a digital TV receiver/decoder ("set top box") connected to a network, an access gateway to an IP network or even in the case of hybrid networks, a device providing the reception functions on each of the networks. The device comprises physical means useful for implementing an embodiment of the invention, for example a processor 510 (CPU), a random access memory 530 (for example a RAM) a programme memory 520 (for example a ROM), a hard disk 540 and at least one network interface 550 such as a demodulator (cable, satellite or radio), an IP port, an ADSL demodulator, a 3G modem for mobile networks. The network interface is suitable for the reception of data on an IP network, a television broadcast network, a mobile network on a transport channel 560. Advantageously, the decoder comprises a second network interface so as to be able to record a content while a second content is being watched. The CPU records the data packets in the RAM memory or on the hard disk in the form of a file from information relating to the identifier $M_i$. According to one embodiment the CPU also provides the function of decoding the video stream recorded and sends the decoded content to a display device such as a television screen.

The invention claimed is:

1. A method for signaling audiovisual contents comprising:
   inserting an identifier associated with a first audiovisual content into a signaling stream, said signaling stream describing said first audiovisual content, said describing said first audiovisual content comprising including a name and a channel for said first audiovisual content, said first audiovisual content including a plurality of content streams, each content stream being one of audio and video and encoded into data packets, said data packets included in transport packets of a transport stream, said transport stream including a plurality of audiovisual contents and being adapted to be broadcast to a plurality of reception devices, wherein said identifier uniquely determines said first audiovisual content in said signaling stream and in said transport stream;
   inserting said identifier into at least one first transport packet of said transport stream, said at least one first transport packet comprising at least one data packet of one of said plurality of content streams of said first audiovisual content,
   wherein said identifier is derived from at least one characteristic comprising a title of said first audiovisual content and said transport stream is one of an internet protocol (IP) transport stream and said identifier is inserted into an extension field of real-time transport protocol (RTP) packets of said IP transport stream and a moving picture expert group 2 transport stream (MPEG2-TS) and said identifier is inserted as private data into an adaptation field of transport packets of said MPEG2-TS transport stream.

2. The method according to claim 1, wherein said first transport packet is an intra-picture.

3. The method according to claim 1, wherein said at least one first transport packet includes data packets from only one of said plurality of content streams.

4. A method for recording audiovisual contents comprising:
   receiving a signaling stream, said signaling stream describing a first audiovisual content, said describing said first audiovisual content comprising including a name and a channel for said first audiovisual content, said first audiovisual content including a plurality of content streams, each content stream being one of audio and video and encoded into data packets, said data packets included in transport packets of a transport stream, said transport stream broadcast to a plurality of reception devices and including a plurality of audiovisual contents;
   detecting, in said signaling stream, an identifier associated with said first audiovisual content, wherein said identifier uniquely determines said —first audiovisual content in said signaling stream and in said transport stream;

when said identifier is an identifier associated with a content to record, detecting said identifier in at least one first transport packet of said transport stream, said at least one first transport packet comprising at least one data packet of one of said plurality of content streams of said first audiovisual content, and recording each data packet included in said at least one first transport packet, wherein said identifier is derived from at least one characteristic comprising a title of said first audiovisual content and said transport stream is an internet protocol (IP) transport stream and said identifier is inserted into an extension field of real-time transport protocol (RTP) packets of said IP transport stream a moving picture expert group 2 transport stream (MPEG2-TS) and said identifier is inserted as private data into an adaptation field of transport packets of said MPEG2-TS transport stream.

5. The method according to claim 4, wherein said recording comprises recording data packets comprised in at least one second transport packet of said transport stream, said second transport packet being associated with said first transport packet.

6. The method according to claim 4, said method comprising selecting a content to record from said contents and determining an identifier associated with said selected content from said signaling stream.

7. The method according to claim 4, said method comprising activating data packet reception of said transport stream according to said signaling stream.

8. The method according to claim 4, wherein said recording further comprises recording data packets of at least one second of said content stream, said data packets being comprised in at least one second transport packet of said transport stream, said second transport packet being associated with said first transport packet from a program map (PMT) table comprised in said transport stream.

9. The method according to claim 4, wherein said at least one first transport packet includes data packets from only one of said plurality of content streams of said first audiovisual content.

10. A receiving device for recording audiovisual contents, said device comprising at least one processor configured for:
receiving a signaling stream, said signaling stream describing a first audiovisual content, said describing said first audiovisual content comprising including a name and a channel for said first audiovisual content, said content including a plurality of content streams, each content stream being one of audio and video and encoded into data packets, said data packets included in transport packets of a transport stream, said transport stream broadcast to a plurality of reception devices and including a plurality of audiovisual contents;

detecting, in said signaling stream, an identifier associated with said first audiovisual content, said identifier uniquely determining said first audiovisual content in said signaling stream and in said transport stream;

when said identifier is an identifier associated with a content to record, detecting said identifier associated with said first audiovisual content in at least one first transport packet of said transport stream, said first transport packet comprising at least one data packet of said one of said plurality of content streams of said first audiovisual content; and recording each data packet included in said at least one first transport packet wherein said identifier is derived from at least one characteristic comprising a title of said first audiovisual content and said transport stream is one of an internet protocol (IP) transport stream and said identifier is inserted into an extension field of real-time transport protocol (RTP) packets of said IP transport stream and a moving picture expert group 2 transport stream (MPEG2-TS) and said identifier is inserted as private data into an adaptation field of transport packets of said MPEG2-TS transport stream.

11. The receiving device according to claim 10, wherein said at least one first transport packet includes data packets from only one of said plurality of content streams of said first audiovisual content.

12. The receiving device according to claim 10, wherein said recording further comprises recording data packets comprised in at least one second transport packet of said transport stream, said second transport packet being associated with said first transport packet.

13. A signaling device for signaling audiovisual contents, said device comprising at least one processor configured for:
inserting, an identifier associated with a first audiovisual content into a signaling stream, said signaling stream describing said first audiovisual content, said describing said first audiovisual content comprising including a name and a channel for said first audiovisual content, said content including a plurality of content streams, each content stream being one of audio and video and encoded into data packets, said data packets included in transport packets of a transport stream, said transport stream broadcast to a plurality of reception devices and including a plurality of audiovisual contents, wherein said identifier uniquely determines said first audiovisual content in said signaling stream and in said transport stream;

inserting said identifier into at least one first transport packet of said transport stream, said at least one first transport packet comprising at least one data packet of one of said plurality of content streams of said first audiovisual content, wherein said identifier is derived from at least one characteristic comprising a title of said first audiovisual content and said transport stream is one of an internet protocol (IP) transport stream and said identifier is inserted into an extension field of real-time transport protocol (RTP) packets of said IP transport stream and a moving picture expert group 2 transport stream (MPEG2-TS) and said identifier is inserted as private data into an adaptation field of transport packets of said MPEG2-TS transport stream.

14. The signaling device according to claim 13, wherein said at least one first transport packet includes data packets from only one of said plurality of content streams of said first audiovisual content.

15. The signaling device according to claim 13, wherein said first transport packet is an intra-picture.

* * * * *